(12) United States Patent
Kim et al.

(10) Patent No.: US 8,114,933 B2
(45) Date of Patent: Feb. 14, 2012

(54) THERMOPLASTIC RESIN COMPOSITION WITH LOW COEFFICIENT OF LINEAR THERMAL EXPANSION

(75) Inventors: Tae Uk Kim, Gyeonggi-do (KR); Hee Seok Na, Incheongwangyeok-si (KR); Duk Hee Kim, Incheongwangyeok-si (KR)

(73) Assignee: Cheil Industries Inc., Seoul (KR)

( * ) Notice: Subject to any disclaimer, the term of this patent is extended or adjusted under 35 U.S.C. 154(b) by 1058 days.

(21) Appl. No.: 11/809,444

(22) Filed: May 31, 2007

(65) Prior Publication Data
US 2007/0260013 A1 Nov. 8, 2007

Related U.S. Application Data

(63) Continuation-in-part of application No. PCT/KR2004/003319, filed on Dec. 16, 2004.

(30) Foreign Application Priority Data

Dec. 2, 2004 (KR) .................. 10-2004-0100170

(51) Int. Cl.
C08L 25/12 (2006.01)
C08L 33/20 (2006.01)
C08L 51/04 (2006.01)

(52) U.S. Cl. ............. 524/445; 525/73; 525/74; 525/83

(58) Field of Classification Search ............... 525/83, 525/73, 74, 63, 64; 524/445
See application file for complete search history.

(56) References Cited

U.S. PATENT DOCUMENTS

| | | | |
|---|---|---|---|
| 2,694,692 A | 11/1954 | Otis | |
| 3,642,949 A * | 2/1972 | Stafford et al. | 525/74 |
| 4,197,376 A * | 4/1980 | Lee et al. | 525/74 |
| 4,305,869 A * | 12/1981 | Lee et al. | 524/342 |
| 4,695,402 A | 9/1987 | Finlayson et al. | |
| 5,334,658 A | 8/1994 | Blumenstein | |
| 5,780,376 A * | 7/1998 | Gonzales et al. | 501/146 |
| 6,252,020 B1 | 6/2001 | Kuo et al. | |
| 7,393,889 B2 | 7/2008 | Doh | |
| 2002/0165317 A1 * | 11/2002 | Adedeji et al. | 525/63 |
| 2004/0167264 A1 | 8/2004 | Vathauer | |
| 2004/0167268 A1 | 8/2004 | Vathauer | |
| 2004/0254284 A1 * | 12/2004 | Doh | 524/445 |

FOREIGN PATENT DOCUMENTS

| | | |
|---|---|---|
| DE | 10109225 | 9/2002 |
| WO | WO 99 43747 | 9/1999 |
| WO | WO 2004 484474 | 6/2004 |

OTHER PUBLICATIONS

Wang et al., "Preparation and thermal properties of ABS/montmorillonite nanocomposite", Polymer Degradation and Stability, 77 (2002) 423-426.
Alexandre et al., "Polymer-layered silicate nanocomposites: preparation, properties and uses of a new class of materials", Material Science and Engineering, 28 (2000) 1-63.
Supplementary European Search Report in EP 04 08 8450, Jun. 17, 2008.

* cited by examiner

*Primary Examiner* — Jeffrey Mullis
(74) *Attorney, Agent, or Firm* — Maria Parrish Tungol

(57) ABSTRACT

The thermoplastic rubber grafted copolymer resin composition comprising (A) about 100 parts by weight of a rubber grafted copolymer prepared by (a1) about 10 to 100 parts by weight of a rubber-modified grafted copolymer and (a2) about 0 to 90 parts by weight of copolymer prepared by vinyl cyanide compound/aromatic vinyl compound or methyl methacrylate or N-phenyl maleimide/vinyl cyanide monomer or aromatic vinyl monomer/methyl methacrylate or N-phenyl maleimide; (B) about 1 to 30 parts by weight of a maleic anhydride copolymer; and (C) about 1 to 20 parts by weight of a clay treated with a compound containing reactive functional groups; wherein said compound containing functional groups has a radical-polymerizable group and an onium ion that can ion-exchange with said clay.

9 Claims, No Drawings

THERMOPLASTIC RESIN COMPOSITION WITH LOW COEFFICIENT OF LINEAR THERMAL EXPANSION

This application is a continuation-in-part of International Application No. PCT/KR2004/003319 filed on Dec. 16, 2004 and published in English as WO 2006/059814 on Jun. 8, 2006.

TECHNICAL FIELD

The present invention relates to a thermoplastic resin composition. More particularly, the present invention relates to a thermoplastic composition containing maleic anhydride copolymer and treated clay. The compositions have a low coefficient of linear thermal expansion, good impact strength, good surface gloss and thermal resistance.

BACKGROUND ART

Acrylonitrile-butadiene-styrene (ABS) type resins are generally used in electrical appliances, parts of vehicle or the like because of their good balance of properties of the components, e.g., processability of styrene, chemical resistance of acrylonitrile and impact strength of butadiene.

At present, there have been a lot of efforts to improve impact strength of the acrylonitrile-butadiene-styrene type resins. For example, one method for preparing the ABS resin is accomplished by the emulsion polymerization of rubber particles prepared by continuous polymerization as disclosed in U.S. Pat. Nos. 4,430,478; 5,605,963; 5,696,204; and so on.

However, the conventional high impact ABS resin has the weakness of deteriorated dimensional stability of the resin due to increasing linear thermal expansion coefficient. For example, if a product employing the resin is exposed to rapid changes of ambient temperatures, the product may crack due to repetitive stress caused by thermal expansion and contraction of the product. This mainly occurs in cases where the resin is applied in internal or external materials of vehicles.

In order to lower linear expansion coefficient and minimize dimensional changes caused by thermal changes, inorganic fillers are typically used. Especially, a lot of glass fiber is used to increase modulus and thermal resistance of the resin. Although this kind of conventional method can lower the linear expansion coefficient, the surface gloss of the ABS resin as a result of the inorganic filler is too poor to be used in external materials.

U.S. Pat. Nos. 4,816,510 and 5,965,655 disclose lowering linear expansion by applying mica or wollastonite to polyphenylene ether or polycarbonate resin. However, this results in lower impact strength of the resin.

Another conventional method minimizes the amount of rubber elastomer in the ABS resin and adds N-phenyl maleimide copolymer to the ABS resin in order to improve heat resistance and dimensional stability of the ABS resin. Although employing N-phenyl maleimide gives the resin improved heat resistance, this method cannot lower the linear thermal expansion coefficient of the resin.

In order to use the ABS resin in external materials of vehicles which may undergo rapid temperature changes, the ABS resin should have a low coefficient of linear thermal expansion, high impact strength and good surface gloss for post-processes such as coating and plating.

SUMMARY OF THE INVENTION

The thermoplastic resin compositions according to the present invention have a low coefficient of linear thermal expansion, good impact strength, good thermal resistance, and good surface gloss.

The thermoplastic compositions according to the present invention comprise:

(A) about 100 parts by weight of a rubber grafted copolymer prepared by (a1) about 10 to 100 parts by weight of a rubber-modified grafted copolymer and (a2) about 0 to 90 parts by weight of a copolymer prepared from 1) vinyl cyanide compound/aromatic vinyl compound or 2) methyl methacrylate, or N-phenyl maleimide/vinyl cyanide compound or 3) methyl methacrylate, or N-phenyl maleimide//aromatic vinyl compound; and (B) about 1 to 30 parts by weight of a vinyl copolymer containing maleic anhydride; and (C) about 1 to 20 parts by weight of a clay treated with a compound containing reactive groups;

wherein said compound containing reactive groups comprises an onium ion and a radical polymerizable group, and wherein the onium ion can ion-exchange with said clay.

DETAILED DESCRIPTION OF THE INVENTION (A) Rubber Grafted Copolymer

The rubber grafted copolymer used in the present invention is a resin composition of the general type exemplified by and often referred to as acrylonitrile-butadiene-styrene (ABS) resin. As discussed hereafter, rubbers and monomers other than butadiene and acrylonitrile and styrene can be used to produce ABS type resins. The rubber grafted copolymer resin may comprise a rubber-modified grafted copolymer (a1) independently, and may additionally comprise a copolymer of a vinyl cyanide compound and an aromatic vinyl compound (a2).

The rubber-modified grafted copolymer (a1) may be prepared by emulsion polymerization, bulk polymerization, solution polymerization, suspension polymerization, or the like. The emulsion polymerization or bulk polymerization is often used.

The rubber-modified grafted copolymer (a1) of the present invention may be prepared by one method, or may be prepared by mixing such copolymers prepared by at least two different methods. For example, a mixture of rubber-modified grafted copolymers prepared by emulsion polymerization and bulk polymerization can also be used.

The rubber-modified grafted copolymer can be prepared by graft-polymerizing a rubber polymer with a vinyl cyanide compound and an aromatic vinyl compound.

The rubber polymer can be prepared by emulsion or bulk polymerization of butadiene monomers with one or more optional comonomer(s). The monomers used to prepare the rubber polymer may be alkyl acrylate as well as butadiene, and the comonomer may be isoprene, chloroprene, acrylonitrile, styrene, α-methyl styrene, alkyl styrene, alkyl methacrylate, divinyl benzene, or the like. The comonomer is used in the amount of less than about 50 parts by weight, and preferably less than about 30 parts by weight. Methods of preparing the rubber polymer are well known in the art.

The vinyl cyanide compound may be acrylonitrile, methacrylonitrile, ethacrylonitrile, or the like. The aromatic vinyl compound may be styrene, o-, m-, p-ethyl styrene, α-methyl styrene, or the like. The weight ratio of the vinyl cyanide compound to the aromatic vinyl compound is in the range of 50:50 to 90:10. A methyl methacrylate or an N-phenyl maleimide may be substituted altogether or partly for the vinyl cyanide compound or the aromatic vinyl compound. The rubber polymer can be graft polymerized with 1) vinyl cyanide monomer and aromatic vinyl monomer or 2) methyl methacrylate or N-phenyl maleimide and vinyl cyanide monomer or 3) methyl methacrylate or N-phenyl maleimide and aromatic vinyl monomer.

The rubber polymer of the rubber-modified copolymer (a1) is used in the amount of about 10 to 70 parts by weight, and preferably about 10 to 60 parts by weight.

The copolymer prepared by a vinyl cyanide compound and an aromatic vinyl compound (a2) of the present invention may be prepared by emulsion polymerization, bulk polymerization, solution polymerization, suspension polymerization, or the like and the weight-average molecular weight is in the range of 50,000 to 600,000. The vinyl cyanide compound may be acrylonitrile, methacrylonitrile, ethacrylonitrile, or the like. The aromatic vinyl compound may be styrene, o-, m-, p-ethyl styrene, α-methyl styrene, or the like. The weight ratio of the vinyl cyanide compound over the aromatic vinyl compound is in the range of 50:50 to 90:10.

A methyl methacrylate or an N-phenyl maleimide may be substituted altogether or partly for the vinyl cyanide compound or the aromatic vinyl compound.

The weight ratio of the rubber-modified grafted copolymer (a1) to the copolymer of the vinyl cyanide compound and the aromatic vinyl compound is preferably in the range of 10:90 to 100:0, and more preferably 15:85 to 100:0. The amount of the rubber polymer of the rubber grafted copolymer (A) is about 5 to about 30 parts by weight. If the rubber polymer is used under 5 parts by weight, impact strength of the resin becomes poor and if used over 30 parts by weight, the coefficient of linear thermal expansion increases rapidly.

(B) Vinyl Copolymer Containing Maleic Anhydride

The maleic anhydride copolymer (B) of the present invention is a copolymer of about 0.1 to 20 parts by weight of maleic anhydride and about 99.9 to 80 parts by weight of a vinyl cyanide compound or an aromatic vinyl compound.

The vinyl cyanide compound or the aromatic vinyl compound is used independently or in the form of mixture of more than two compounds. The vinyl cyanide compound may be acrylonitrile, methacrylonitrile, ethacrylonitrile, or the like and the aromatic vinyl compound may be styrene, o-, m-, p-ethyl styrene, α-methyl styrene or the like. The weight ratio of the vinyl cyanide compound over the aromatic vinyl compound, if they are used together, is in the range of 50:50 to 90:10.

In the present invention, methyl methacrylate or an N-phenyl maleimide may be substituted altogether or partly for the vinyl cyanide compound or the aromatic vinyl compound.

The amount of the maleic anhydride in the vinyl copolymer containing maleic anhydride (B) is preferably about 0.1 to 20 and more preferably about 1 to 10. If the maleic anhydride is used under 0.1 parts by weight, dispersion of a clay may not be sufficient and then impact strength may be decreased. If used over 20 parts by weight, heat stability may be decreased and then thermal deposition may occur in the process. The vinyl copolymer containing maleic anhydride (B) is used preferably about 1 to 30 parts by weight per 100 parts by weight of the rubber grafted copolymer (A), and more preferably about 5 to 20 parts by weight. If used under 1 part by weight, impact strength may be decreased due to the insufficient dispersion of a clay. If used over 30 parts by weight, pin-holes may occur on the surface of the resin resulting in the surface gloss being deteriorated.

(C) Clay Treated with an Organic Compound Containing Reactive Groups

The clay (C) used herein is a laminated material with each layer having the length and width from about 500 to 20,000 Å and the thickness from about 9 to 12 Å. The distances between each of the layers are about 10 Å. It has an aggregated form stacked with a lot of plates or layers. The clay used in the present invention is smectite clay such as montmorillonite, saponite and hectorite, and these may be used independently or as a mixture of at least two.

The clay used is plate-like particles capable of exchanging cations from 50 to 200 milli-equivalents per 100 grams and is easily refreshed or reconditioned by an ion exchange reaction with an onium ion such as ammonium ion with azo or peroxide group.

The organic compounds used to treat the clay have an onium ion that can ion-exchange with the clay and also have a radical-polymerizable group. These compounds may be used independently or as a mixture of two or more compounds. The radical-polymerizable group is selected from the group consisting of a vinly group and a hydroxyl group. If the compounds used to treat the clay do not have a reactive group, dispersion of the resin may become poor and a low enough coefficient of linear thermal expansion may not be obtained.

The compounds having vinyl group as the radical-polymerizable group are vinyl compounds including, but not limited to, vinyl benzil trimethyl ammonium chloride, vinyl benzil trimethyl ammonium bromide, vinyl benzil trimethyl ammonium iodide, vinyl benzil triethyl ammonium chloride, vinyl benzil triethyl ammonium bromide, or vinyl benzil triethyl ammonium iodide.

The compounds having hydroxyl group as the radical-polymerizable group include, but are not limited to, compounds such as dimethyl diethoxymethyl hydrogenated tallow alkyl ammonium chloride or stearil bis(2-hydroxy ethyl) methyl ammonium chloride.

The clay treated with the compound in the present invention has about 10 to 50 parts by weight of the organic compound, and preferably about 20 to 40 parts by weight. If the organic compound is used under 10 parts by weight, dispersion in the resin may become weak, and if the organic compound is used over 50 parts by weight, it may be easily deformed in the later processes.

The clay treated with an organic compound containing reactive groups (C) is used in the amount of about 1 to 20 parts by weight per 100 parts by weight of the rubber grafted copolymer (A), and preferably about 2 to 10 parts by weight. If the clay treated with an organic compound is used under about 1 part by weight, the coefficient of linear thermal expansion may not decrease sufficiently, and if used over 30 parts by weight, the impact strength of the resin becomes poor.

The thermoplastic resin compositions according to the present invention are suitable for producing a variety of articles, particularly molded articles, by methods well known in the art.

The compositions according to the present invention may further contain an impact modifier, an antioxidant, a lubricant, a light stabilizer, a pigment and/or a dye.

The present invention may be better understood by reference to the following examples that are intended for the purpose of illustration and are not to be construed as in any way limiting the scope of the present invention, which is defined in the claims appended hereto.

EXAMPLES

The components to prepare the thermoplastic resin composition of the present invention in Examples and Comparative Examples are as follows:
(A) Rubber Grafted Copolymer
   (a1) Rubber-modified Grafted Copolymer
   (a1-1) A grafted copolymer comprising 50 parts by weight of polybutadiene, 15 parts by weight of acrylonitrile, and 35 parts by weight of styrene was used.
   (a1-2) A grafted copolymer comprising 15 parts by weight of polybutadiene, 25 parts by weight of acrylonitrile, and 60 parts by weight of styrene was used.
   (a2) Copolymer prepared by a Vinyl Cyanide Compound and an Aromatic Vinyl Compound
   A copolymer comprising 30 parts by weight of acrylonitrile and 70 parts by weight of styrene and having weight-average molecular weight of 200,000 was used.
(B) Vinyl Copolymer Containing Maleic Anhydride
   A vinyl copolymer comprising 5 parts by weight of maleic anhydride, 50 parts by weight of styrene and 40 parts by weight of N-phenyl maleimide.
(C) Clay Treated with an Organic Compound Containing Reactive Group
   (c1) Clay Treated with a Compound containing Hydroxyl Group
   A clay was prepared by 75 parts by weight of montmorillonite clay having plate-like pieces with length and width of about 500 to 2,000 Å and the thickness of 9 to 12 Å. The clay was treated with 25 parts by weight of stearil bis (2-hydroxy ethyl)methyl ammonium chloride.
   (c2) Clay Treated with a Organic Compound containing Vinyl Group
   A clay was prepared by 75 parts by weight of montmorillonite clay having plate-like pieces with the length and width of about 500 to 2,000 Å and the thickness of 9 to 12 Å. The clay was treated with 20 parts by weight of vinyl benzil trimethyl ammonium chloride.
(D) Clay Treated with an Organic Compound Containing no Reactive Group
   A clay mineral prepared by 75 parts by weight of montmorillonite clay having plate-like pieces with the length and width of about 500 to 2,000 Å and the thickness of 9 to 12 Å was used. The clay was treated with 25 parts by weight of dimethyl dehydrogenated tallow alkyl ammonium chloride.

Examples 1-3 and Comparative Example 1-6

The above-mentioned components with optionally added glass fiber and talc were mixed as shown in Table 1 and then molten and extruded to make pellets. The extrusion was conducted in a conventional twin-screw extruder having L/D=29 and screw diameter of 45 mm. The temperature in the cylinder was 240° C. The prepared pellets were injection-molded to make test specimens and their properties were measured. The test specimens were 1.0 cm×1.0 cm×0.6 cm of size. The coefficients of linear thermal expansion of the specimens were measured. The results are shown in below Table 1.

The properties of the specimens were measured as follows:
(1) Izod impact strength was measured in accordance with ASTM D256 (23° C., ¼").
(2) Heat resistance (HDT: Heat Deflection Temperature) was measured in accordance with ASTM D648 (¼", 18.5 kgf.cm², 120° C./hr).
(3) Coefficient of linear thermal expansion was measured with temperature being increased at the rate of 5° C./min from 30 to 80° C. using a thermal mechanic analyzer (TMA).
(4) Gloss was measured using a gardner gloss meter at a measuring angle of 60°.

TABLE 1

| | | Examples | | | Comparative Examples | | | | | |
|---|---|---|---|---|---|---|---|---|---|---|
| | | 1 | 2 | 3 | 1 | 2 | 3 | 4 | 5 | 6 |
| (A) | (a1-1) | 30 | — | 15 | 30 | — | 15 | — | 30 | 30 |
| | (a1-2) | — | 100 | 50 | — | 100 | 50 | 100 | — | — |
| | (a2) | 70 | — | 35 | 70 | — | 35 | — | 70 | 70 |
| (B) | | 4 | 4 | 4 | — | — | — | — | — | — |
| (C) | (c1) | 5 | 5 | — | — | — | — | — | — | 5 |
| | (c2) | — | — | 5 | — | — | — | — | — | — |
| (D) | | — | — | — | 5 | — | — | — | — | — |
| Glass fiber | | — | — | — | — | 5 | — | — | — | — |
| Talc | | — | — | — | — | — | 10 | 10 | — | — |
| Impact strength | | 7.5 | 7.9 | 8.1 | 4.7 | 4.9 | 10 | 12 | 30 | 4.2 |
| Thermal resistance (HDT) | | 94 | 94 | 94 | 97 | 98 | 89 | 87 | 87 | 90 |
| Coefficient of linear thermal expansion | | 75 | 76 | 75 | 88 | 67 | 90 | 91 | 95 | 79 |
| Gloss | | 62 | 54 | 57 | 63 | 20 | 43 | 41 | 95 | 55 |

As shown in Table 1 above, Examples according to the present invention have improved impact strength, a low coefficient of linear thermal expansion, good heat resistance and gloss compared to those of Comparative Examples.

Comparative Examples 1 and 2 using clay treated with a compound containing neither reactive group nor glass fiber as compared to the clay treated with a compound containing a reactive group (c1) or (c2) of the present invention exhibited too low impact strength and gloss to use in vehicle materials or plating/coating. Comparative Examples 3 and 4 which used talc instead of (c1) or (c2) had a coefficient of linear thermal expansion that was too high to use in vehicle materials or plating/coating although they had enough impact strength. In addition, Comparative Examples 5 and 6 which did not use a vinyl copolymer containing maleic anhydride (B) had a coefficient of linear thermal expansion that was too high to use in vehicle materials or plating/coating.

Many modifications and changes may be deemed to be with the scope of the present invention as defined in the following claims.

What is claimed is:
1. A thermoplastic rubber grafted copolymer resin composition comprising:
   (A) about 100 parts by weight of
      (a1) about 10 to 100 parts by weight of a rubber-modified grafted copolymer prepared by graft-polymerizing a rubber polymer with 1) vinyl cyanide monomer and aromatic vinyl monomer or 2) methyl methacrylate or N-phenyl maleimide and vinyl cyanide monomer or 3) aromatic vinyl monomer and methyl methacrylate or N-phenyl maleimide and
      (a2) about 0 to 90 parts by weight of copolymer prepared by polymerizing 1) vinyl cyanide monomer and aromatic vinyl monomer or 2) methyl methacrylate or N-phenyl maleimide and vinyl cyanide monomer or 3) aromatic vinyl monomer and methyl methacrylate or N-phenyl maleimide;
   (B) about 1 to 30 parts by weight of maleic anhydride copolymer material and
   (C) about 1 to 20 parts by weight of a clay treated with a compound having onium ion and vinyl group or hydroxyl group wherein the onium ion is ion exchanged with the clay wherein all the maleic anhydride copolymer material present in said thermoplastic rubber grafted copolymer resin composition consists of ungrafted maleic anhydride copolymer produced by polymerization of a monomer mixture consisting of maleic anhydride and at least one of acrylonitrile, methacrylonitrile, ethacrylonitrile, styrene, α-, m-, p-ethyl styrene, α-methyl styrene, or N-phenyl maleimide.

2. The composition as defined in claim 1, wherein said rubber grafted copolymer (A) comprises about 5 to 30 parts by weight of a rubber polymer per total weight of (A).

3. The composition as defined in claim 1, wherein (a1) is prepared by graft—polymerizing a rubber polymer with a vinyl cyanide monomer and at least one of styrene, α-, m-, p-ethyl styrene, or α-methyl styrene.

4. The composition as defined in claim 1, wherein the maleic anhydride copolymer material (B) is an ungrafted maleic anhydride copolymer containing about 0.1 to 20 parts by weight of a maleic anhydride per total weight of (B).

5. The composition as defined in claim 1, wherein said clay comprises a smectite clay.

6. The composition as defined in claim 1, wherein said clay is montmorillonite, saponite or hectorite.

7. The composition as defined in claim 1, wherein the clay is treated with from about 10 to 50 parts by weight of the compound per 100 parts by weight of the clay.

8. The composition as defined in claim 1, further comprising an impact modifier, an antioxidant, a lubricant, a light stabilizer, a pigment, or a dye.

9. A molded article produced from the composition of claim 1.

* * * * *